(12) United States Patent
Van Look et al.

(10) Patent No.: US 10,893,211 B2
(45) Date of Patent: Jan. 12, 2021

(54) METHODS AND SYSTEMS OF LIMITING EXPOSURE TO INFRARED LIGHT

(71) Applicant: SEMICONDUCTOR COMPONENTS INDUSTRIES, LLC, Phoenix, AZ (US)

(72) Inventors: Toon Van Look, Zoutleeuw (BE); Ladislav Bazant, Brno (CZ)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 149 days.

(21) Appl. No.: 16/170,400

(22) Filed: Oct. 25, 2018

(65) Prior Publication Data
US 2019/0394380 A1 Dec. 26, 2019

Related U.S. Application Data

(60) Provisional application No. 62/689,599, filed on Jun. 25, 2018.

(51) Int. Cl.
*H04N 5/235* (2006.01)
*G03B 15/02* (2006.01)
*G03B 7/00* (2014.01)

(52) U.S. Cl.
CPC ............ *H04N 5/2353* (2013.01); *G03B 7/00* (2013.01); *G03B 15/02* (2013.01)

(58) Field of Classification Search
CPC .................................................. H04N 5/2353
USPC ........................................................ 348/362
See application file for complete search history.

(56) References Cited

U.S. PATENT DOCUMENTS

| 5,021,937 A | 6/1991 | Cohen |
| 7,731,403 B2 | 6/2010 | Lynam et al. |
| 2004/0155844 A1 | 8/2004 | Stopa |
| 2008/0001061 A1 | 1/2008 | Glassner et al. |

(Continued)

OTHER PUBLICATIONS

Texas Instruments, "LM3553 1.2A Dual Flash LED Driver System with I²C Compatible Interface," Product Folder LM3553, SNVS414B—Feb. 2008—Revised May 2013, 26 pages, Copyright 2008-2013 Texas Instruments Incorporated.

(Continued)

*Primary Examiner* — Joel W Fosselman
(74) *Attorney, Agent, or Firm* — Dickinson Wright PLLC; Mark E. Scott (57) ABSTRACT

Limiting exposure to infrared light. At least some of the example embodiments are methods including: repeatedly illuminating a field of view of an image sensor with infrared light from a light emitting diode (LED), each illumination defining an exposure time, and time between contiguous illuminations defining a frame period; and forcing the frame period to be greater than a frame period threshold. Forcing the frame period to be greater than the frame period threshold may also include setting the frame period threshold by a first resistor coupled to a first terminal of a LED driver circuit. Setting the frame period threshold further may also include setting the frame period threshold by a first resistor coupled between ground and the first terminal of the LED driver circuit. The methods further include limiting exposure time of each illuminations to be less than an exposure time threshold.

17 Claims, 6 Drawing Sheets

(56) References Cited

U.S. PATENT DOCUMENTS

2014/0063286 A1* 3/2014 Okada ................ H04N 5/2256
348/229.1
2014/0139655 A1 5/2014 Mimar
2016/0360074 A1* 12/2016 Winer ................ H04N 5/2256

OTHER PUBLICATIONS

Richtek, "RT9387A-700mA Charge Pump Flash LED Driver with Safety Timer," https://www.richtek.com/en/Products/LED Driver/White LED Driver/R, web page printed Aug. 21, 2018, Copyright 2014 Richtek Technology Corporation.

Semtech, "SC618-Charge Pump Flash LED Driver with Safety Timer," Product description, Aug. 2, 2007, 13 pages, Semtech Corporation.

Texas Instruments, "TPS6131x 1.5-A Multiple LED Camera Flash and Video Light Driver With I²C Compatible Interface," Product Folder TPS61310 TPS61311, SLVS978D—Mar. 2010—Revised Sep. 2016, 54 pages, Copyright 2010-2016, Texas Instruments Incorporated.

* cited by examiner

METHODS AND SYSTEMS OF LIMITING EXPOSURE TO INFRARED LIGHT

CROSS-REFERENCE TO RELATED APPLICATIONS

This application claims the benefit of U.S. Provisional Application Ser. No. 62/689,599 filed Jun. 25, 2018 titled "Safety (IR) LED Driver with Limited Exposure Time and Frequency Limitation." The provisional application is incorporated by reference herein as if reproduced in full below.

BACKGROUND

Some automobiles implement driver monitoring to detect when the driver is drowsy. The driver monitoring takes place by capturing images of the driver, and analyzing one or more images to determine the state of the driver. During daylight, there is sufficient ambient light to illuminate the driver. At night, however, other illumination techniques are needed. Some driver monitoring systems use infrared flash systems to illuminate the driver. However, over exposure to infrared light can harm the human eye.

BRIEF DESCRIPTION OF THE DRAWINGS

For a detailed description of example embodiments, reference will now be made to the accompanying drawings in which.

DEFINITIONS

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

"Controller" shall mean individual circuit components, an application specific integrated circuit (ASIC), a microcontroller with controlling software, a digital signal processor (DSP), a field programmable gate array (FPGA), or combinations thereof, configured to read signals and take action responsive to such signals.

In relation to electrical devices, the terms "input" and "output" refer to electrical connections to the electrical devices, and shall not be read as verbs requiring action. For example, a controller may have a gate output and one or more inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various example embodiments are directed to methods and systems of limiting exposure to infrared light created by imaging systems. More particularly, example embodiments are directed to methods and systems of repeatedly illuminating a field of view of an image sensor with infrared light from one or more light emitting diodes (LEDs), with each illumination defining an exposure time, and time between contiguous illuminations defining a frame period. The example embodiments force the frame period to be greater than a frame period threshold. Stated in terms of frame rate, the example embodiments enforce an upper limit on frame rate to control or reduce exposure to the infrared light. Further still, example embodiments may limit exposure time of each illumination to be below an exposure time threshold. The description turns to an example system to orient the reader.

Figure 1:
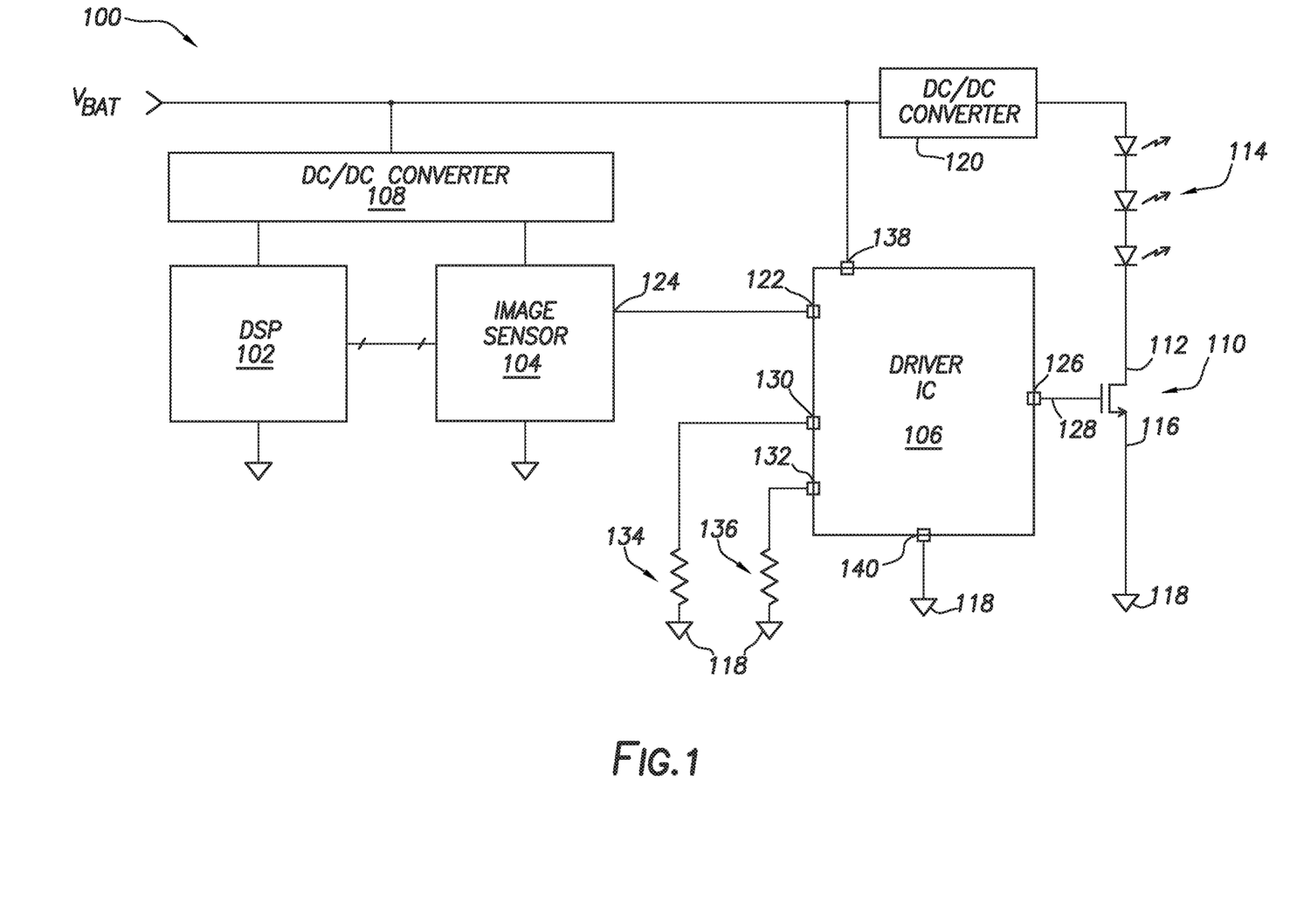
FIG. 1 shows an imaging system in accordance with at least some embodiments.

FIG. 1 shows an imaging system in accordance with at least some embodiments. In particular, the imaging system 100 of FIG. 1 comprises a digital signal processor (DSP) 102, an image sensor 104, and a driver integrated circuit (IC) 106. The DSP 102 and image sensor 104 may be provided power by way of a direct current DC to DC (DC/DC) converter 108. In the example situation of driver monitoring system, the DC/DC converter 108 converts the automobile battery voltage VBAT (e.g., 12 volts) to a voltage more suitable for the DSP 102 and image sensor 104 (e.g., 5 volts, 3.3 volts). In other situations the DC/DC converter 108 may be omitted, or be replaced or augmented with a low drop out (LDO) linear regulator. The driver IC 106 couples to an electrically controlled switch illustratively shown as a field effect transistor (FET) 110. The drain 112 of the FET 110 couples to a cathode connection of one or more infrared LEDs 114 (sometimes referred to as an infrared LED system). The source 116 of the FET 110 couples to ground 118 directly (as shown) or through a sense resistor (not specifically shown). The anode connection of the infrared LEDs 114 couples to an optional DC/DC converter 120. That is, in some situations the voltage applied to the infrared LEDs 114 may need to be higher or lower than the supply voltage VBAT, and in those situations the DC/DC converter 120 may be implemented.

The driver IC 106 comprises a plurality of terminals coupled to various external devices. In particular, the driver IC 106 defines a flash terminal 122 that couples to a flash output 124 of the image sensor 104. The example driver IC 106 further comprises a gate terminal 126 coupled to a gate 128 of the FET 110. When the driver IC 106 asserts the gate terminal 126, the FET 110 becomes conductive enabling current flow through the infrared LEDs 114, thus illuminating a field of view of the image sensor 104. The driver IC 106 further defines an exposure time terminal 130 and a frame period terminal 132. As will be discussed in greater detail below, resistor 134 coupled between the exposure time terminal 130 and ground 118 controls an exposure time threshold implemented by the driver IC 106. Similarly, resistor 136 coupled between the frame period terminal 132 and ground 118 controls a frame period threshold implemented by the driver IC 106. The driver IC 106 also couples to a power source, such as VBAT, by way of the power terminal 138, and couples to ground 118 by way of ground terminal 140. Additional terminals and connections may be present (e.g., a diagnostic terminal, a feedback terminal to sense a value indicative of current flow through the infrared LEDs 114, a voltage sense terminal to sense voltage on the anode connection of the infrared LEDs 114). The additional terminals and their associated functionality are omitted so as not to unduly complicate the description.

In operation, the image sensor 104 repeatedly asserts its flash output 124 indicating a need to illuminate the field of view of the image sensor 104. Responsive to the assertion of the flash terminal 122, the driver IC 106 asserts gate terminal 126 and thus the gate 128 of the example FET 110. In turn, the FET 110 becomes conductive, enabling current flow through the infrared LEDs 114 which illuminate the field of view of the image sensor 104 with infrared light. Once the image is captured by the image sensor 104, the image sensor 104 de-asserts the flash output 124 and thus the flash terminal 122, and in turn the driver IC 106 de-asserts the gate terminal 126 and thus the gate 128 of the FET 110.

In accordance with example embodiments, the driver IC 106 limits the amount of infrared light provided to the field of view of the image sensor, the field of view presumably including a human in the example case of driver monitoring. Limiting the exposure may have two example components. The first component is limiting how often the infrared LEDs 114 are powered to illuminate the field of view of the image sensor, and the second component is a length of time of each exposure. In particular, the example driver IC 106 may be designed and constructed to assert the gate terminal 126 responsive to assertion of the flash terminal 122 until an exposure time exceeds the exposure time threshold. If the exposure time exceeds the exposure time threshold, the gate terminal 126 is de-asserted even if the flash terminal 122 is still asserted. The example driver IC 106 is also designed and constructed to assert the gate terminal 126 responsive to assertion of the flash terminal 122 unless an immediately prior de-assertion of the gate terminal 126 occurred within a time period referred to as a frame period threshold. If the immediately prior de-assertion of the gate terminal 126 occurred within the frame period threshold, the driver IC 106 refrains from asserting the gate terminal 126 even if the flash terminal 122 is asserted by the image sensor 104.

In accordance with example embodiments, the exposure time threshold and the frame period threshold are set by external resistors 134 and 136, respectively. That is, resistor 134 coupled to the exposure time terminal sets and/or controls the exposure time threshold. Resistor 136 coupled to the frame period terminal sets and/or controls the frame period threshold. The inventors of the current specification have found that using external resistors to set or control the thresholds is advantageous over using capacitors for several reasons. First, high precision resistors cost less than capacitors of the same precision. Moreover, using capacitors to set time thresholds implies charging and discharging the capacitors, which charging and discharging creates electromagnetic interference (EMI) issues. Using external resistors to set the exposure time threshold and the frame period threshold is less expensive, and the value of the resistance can be sensed with a DC current, thus limiting the EMI produced.

More particularly then, the example driver IC 106 may be designed and constructed to assert the gate terminal 126 responsive to assertion of the flash terminal 122 until an exposure time meets or exceeds the exposure time threshold as set by the resistor 134 coupled to the exposure time terminal 130. If the exposure time meets or exceeds the exposure time threshold, the gate terminal 126 is de-asserted even if the flash terminal 122 is still asserted. The example driver IC 106 is also designed and constructed to assert the gate terminal 126 responsive to assertion of the flash terminal 122 unless an immediately prior de-assertion of the gate terminal 126 occurred within a frame period threshold as set by resistor 136 coupled to the frame period terminal 132. If the immediately prior de-assertion of the gate terminal 126 occurred within the frame period threshold, the driver IC 106 refrains from asserting the gate terminal 126 even if the flash terminal 122 is asserted by the image sensor 104. The specification now turns to a more detailed description of the driver IC 106.

Figure 2:
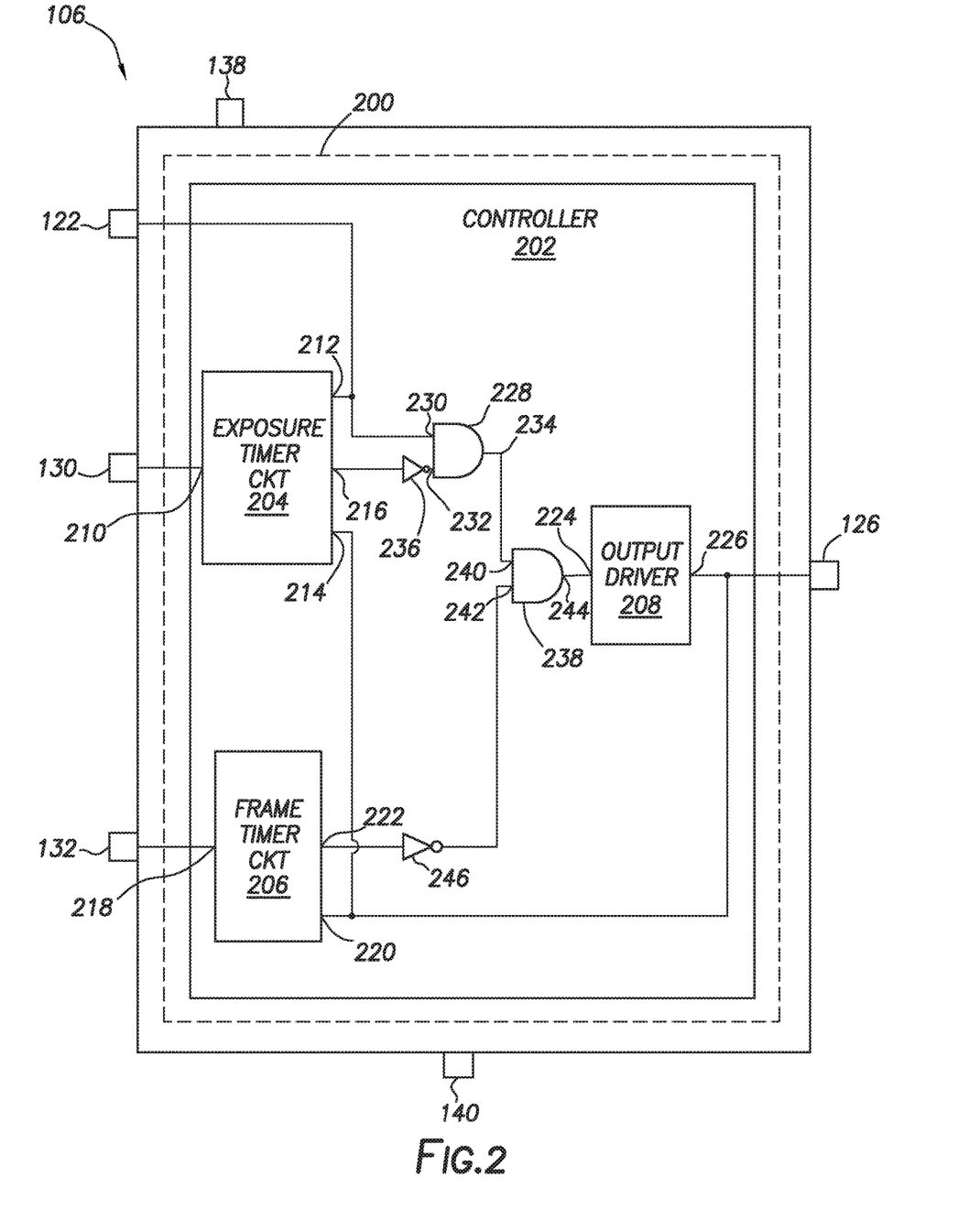
FIG. 2 shows an electrical block diagram of the driver IC in accordance with at least some embodiments.

FIG. 2 shows an electrical block diagram of the driver IC in accordance with at least some embodiments. In particular, FIG. 2 shows the driver IC 106 comprising the flash terminal 122, the gate terminal 126, the exposure time terminal 130, the frame period terminal 132, the power terminal 138, and the ground terminal 140. The terminals may be electrical connections to a packaged integrated circuit of any suitable type, such as a 10 pin dual flat no-lead package (DFN10). Encased within the driver IC 106 is one or more substrates of silicon material upon which the various circuits are constructed. In the example shown in FIG. 2, a single silicon substrate 200 is utilized, but again two or more silicon substrates may be co-packaged in accordance with other example embodiments. It will be understood that the power terminal 138 and ground terminal 140 electrically couple to the internal components, but the connections to the internal components are not shown so as not to unduly complicate the drawings.

The driver IC 106 implements a controller 202. In the example case the controller 202 is constructed on the silicon substrate 200. The controller 202 in the example embodiments comprises an exposure timer circuit 204, a frame timer circuit 206, and an output driver 208. The exposure timer circuit 204 defines an input 210, a flash input 212, a gate input 214, and an exposure lockout output 216. The input 210 is coupled to the exposure time terminal 130, and the exposure time threshold is derived based on the value of the resistance coupled to the input 210. In some cases current may flow out of the input 210, but nevertheless the controller 202, and specifically the exposure timer circuit 204, derives the exposure time threshold based on the current flow, hence the naming convention of "input" for input 210. The flash input 212 is coupled to the flash terminal 122. The gate input 214 is coupled to the gate terminal 126. In accordance with example embodiments, the exposure timer circuit 204 is configured to de-assert the exposure lockout output 216 upon assertion of the flash terminal 122. Stated otherwise, the exposure timer circuit 204 is configured to de-assert an exposure lockout signal (on the exposure lockout output 216) upon assertion of the flash terminal 122. The exposure timer circuit 204 is further configured to assert the exposure lockout output 216 after expiration of the exposure time threshold derived from a resistance coupled to the exposure time terminal 130. Stated otherwise, exposure timer circuit 204 is further configured to assert an exposure lockout signal (on the exposure lockout output 216) after expiration of the exposure time threshold.

The frame timer circuit 206 defines an input 218, a gate input 220, and a frame lockout output 222. The input 218 is coupled to the frame period terminal 132, and the frame period threshold is derived based on the value of the resistance coupled to the input 218. In some cases it may be the current flows out of the input 218, but nevertheless the controller 202, and specifically the frame timer circuit 206, derives the frame period threshold based on the current flow, hence the naming convention of "input" for input 218. The gate input 220 is coupled to the gate terminal 126. In accordance with example embodiments, the frame timer circuit 206 is configured to assert the frame lockout output 222 upon de-assertion of the gate terminal 126. Stated otherwise, the frame timer circuit 206 is configured to assert a frame lockout signal (on the frame lockout output 222) upon de-assertion of the gate terminal 126. The frame timer circuit 206 is further configured to de-assert the frame lockout output 222 after expiration of the frame period threshold derived from a resistance coupled to the frame period terminal 132. Stated otherwise, the frame timer circuit 206 is further configured to de-assert a frame lockout signal (on the frame lockout output 222) after expiration of the frame period threshold.

The Output driver 208 defines a gate input 224 and a gate output 226. The gate output 226 couples to the gate terminal 126. In the example system the gate input 224 indirectly couples to the flash terminal 122, the exposure lockout output 216, and the frame lockout output 222 through example combination logic, discussed more below. The Output driver 208, as the name implies, is designed and constructed to drive the gate 128 (FIG. 1) of the example FET 110 (FIG. 1). More particularly, when the gate input 224 is asserted, the gate output 226 is asserted such that the FET 110 becomes conductive. In the example case of FET 110 being a N-channel FET, the gate output 226 is asserted by being driven high with sufficient voltage to make the FET 110 conductive, and when the gate input 224 is de-asserted the gate output 226 is de-asserted by being driven sufficiently low to make the FET 110 non-conductive. Use of a P-channel FET 110 is merely illustrative, and other types of FETs, and other transistors (e.g., junction transistors) may be used with the asserted and non-asserted states of the gate output 226 adjusted accordingly.

Still referring to FIG. 2, the driver IC 106 (and thus the controller 202) is configured to hold the gate terminal 126 de-asserted when the frame lockout signal (on the frame lockout output 222) is asserted. Moreover, the driver IC is configured to de-assert the gate terminal 126 when the exposure lockout signal (on the exposure lockout output 216) is asserted. The controller 202 implements the noted functionality in any suitable fashion, and in the example circuit by way of series of logic gates. In particular, assuming that the exposure lockout signal and frame lockout signal are asserted high, FIG. 2 shows an example set of logic to implement the functionality. Thus, the example controller 202 implements a logic AND gate 228 that defines a first input 230, a second input 232, and a AND output 234. The first input 230 couples to the flash terminal 122, the second input 232 couples to the exposure lockout output by way of a logic NOT gate 236. The example combination logic further comprises another logic AND gate 238 that defines a first input 240, a second input 242, and a AND output 244. The first input 240 couples to the gate output 234 of the AND gate 228, the second input 242 couples to the frame lockout output 222 by way of a logic NOT gate 246. The AND output 244 couples to the gate input 224 of the Output driver 208. It will be understood that the logic gates shown assume all signals asserted high so as to make the combinational logic easier to follow; however, one of ordinary skill, with the benefit of this disclosure, could create equivalent circuits with some or all the various flash signals and lockout signals asserted low. For example, the NOT gates 236 and 246 may be omitted if the exposure lockout signal and the frame lockout signal are asserted low rather than asserted high. The discussion now turns to an example timing diagram that again assumes, merely as an example, the various signals are asserted high.

Figure 3:
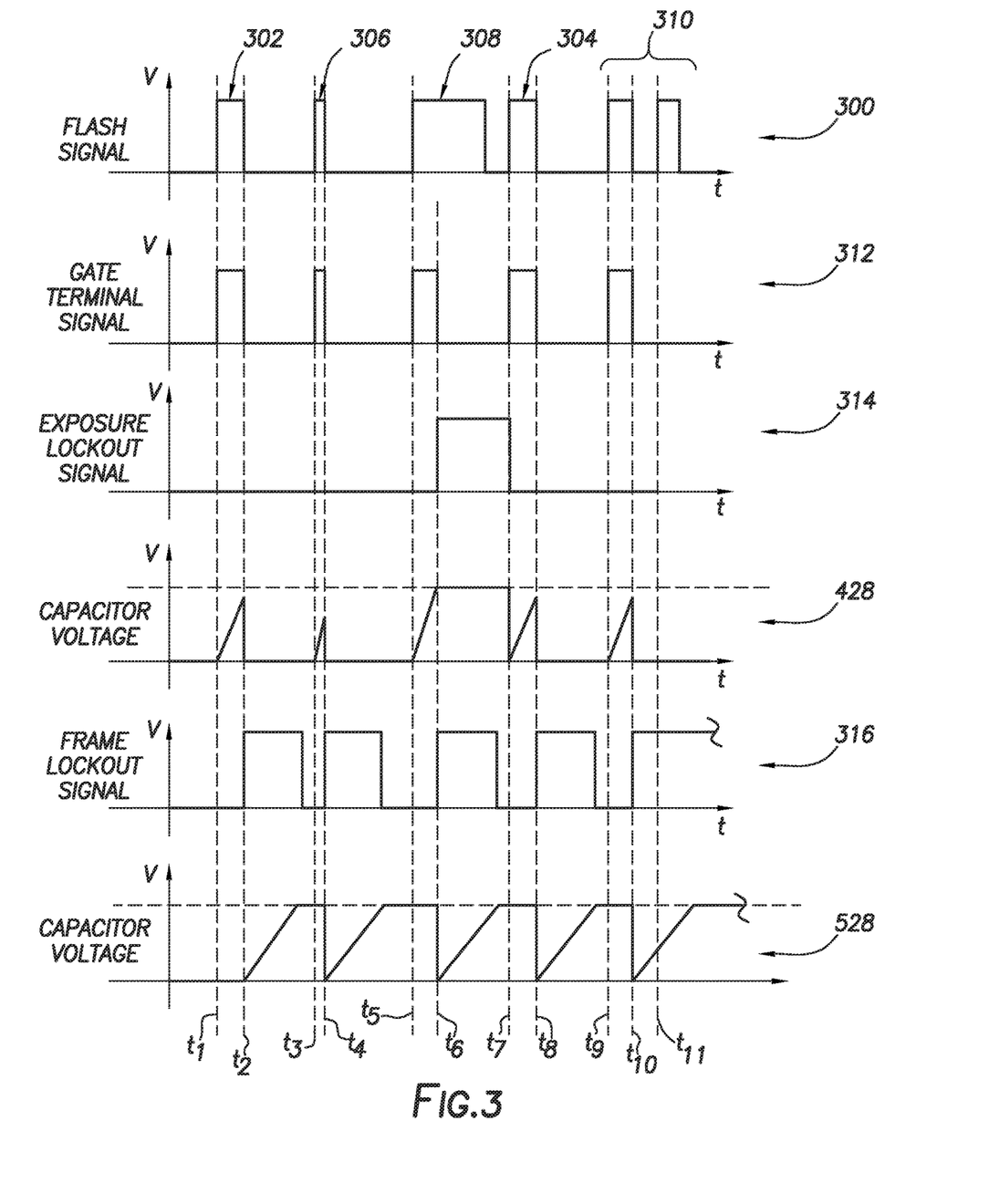
FIG. 3 shows a timing diagram in accordance with at least some embodiments.

FIG. 3 shows a timing diagram in accordance with at least some embodiments. In particular, FIG. 3 shows an example flash signal 300 applied to the flash terminal 122 (FIG. 1) that includes several issues that are addressed by the example driver IC 106 (FIG. 1). The example flash signal 300 shows a normal pulse 302 between times t1 and t2, and another normal pulse 304 between times t7 and t8. The example flash signal 300 shows a short pulse 306 between times t3 and t4. The example flash signal 300 shows a long pulse 308 starting at time t5 and ending after time t6. Finally, the example flash signal 300 shows a set of double pulses 310, the first pulse of the double pulse 310 between times t9 and t10, and the second pulse of the double pulse 310 starting at time t11.

FIG. 3 further shows an example gate terminal signal 312 created by the driver IC 106 (FIG. 1) responsive the example flash signal 300, the gate terminal signal 312 driven to the gate terminal 126 (FIG. 1). For the example normal pulse 304, the gate terminal signal 312 exactly tracks the normal pulse 304. Similarly for the short pulse 306, the gate terminal signal 312 exactly tracks the short pulse 306. However, when the long pulse 308 is applied to the flash terminal 122 (FIG. 1), the gate terminal signal 312 is asserted until the exposure lockout signal 314 is asserted. That is to say, the driver IC 106 is configured to initially assert the gate terminal signal 312 responsive to the rising edge of the long pulse 308. The driver IC 106 (particularly the exposure timer circuit 204 (FIG. 2)) is configured to assert the exposure lockout signal after expiration of the exposure time threshold. When the exposure lockout signal is asserted, the gate terminal signal 312 is de-asserted even though the flash signal 300 (and thus the flash terminal 122) is still asserted. Moreover, the example timing diagram shows that exposure lockout signal 314 is de-asserted upon the next assertion of the flash signal 300 (and thus the flash terminal 122). Thus, in the example embodiments the driver IC 106 limits exposure time during any particular exposure or illumination of the field of view of the image sensor 104 (FIG. 1).

FIG. 3 further shows an example frame lockout signal 316 created by the driver IC 106 (FIG. 1). In particular, in example systems the frame lockout signal 316 is asserted each time the gate terminal signal 312 (and thus the gate terminal 126 (FIG. 1)) is de-asserted. The frame lockout signal 316 remains asserted for the frame period threshold as set by the resistor 136 (FIG. 1) coupled to the frame period terminal 132 (FIG. 1). For example, the frame lockout signal 316 is asserted starting at time t2 when the gate terminal signal 312 is de-asserted, and the frame lockout signal 316 remains asserted for the frame period threshold. In fact, the frame lockout signal 316 is de-asserted before the next pulse for all the example pulses except the double pulse 310. In the case of double pulse 310, the frame lockout signal 316 is asserted when gate terminal signal 312 is de-asserted at time t10, and the frame lockout signal 316 remains asserted during arrival of the second pulse of the double pulse 310 at time t11. Because the frame lockout signal 316 is still asserted at time t11, the driver IC 106 holds the gate terminal signal 312 (and thus the gate terminal 126) de-asserted in spite of the fact the flash signal 300 is asserted. Thus, the driver IC 106 forces the frame period to be greater than the frame period threshold.

The timing diagram of FIG. 3 contains two additional signals that were not discussed, but these two signals will be discussed after introduction of an example exposure timer circuit 204 and frame timer circuit 206.

Figure 4:
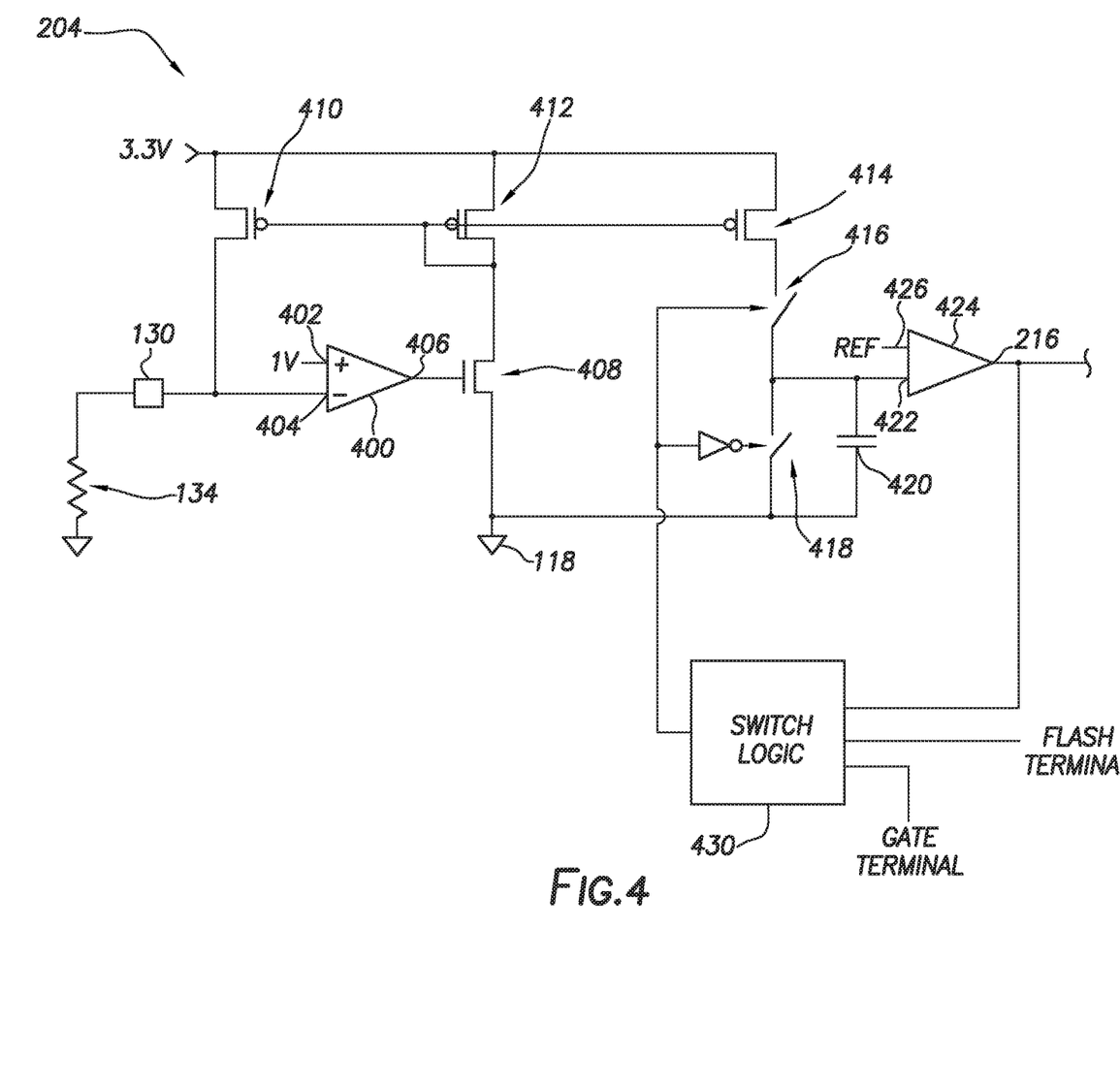
FIG. 4 shows an example exposure timer circuit in accordance with at least some embodiments.

FIG. 4 shows an example exposure timer circuit 204 in accordance with at least some embodiments. In particular, FIG. 4 shows the exposure time terminal 130 coupled to external resistor 134. FIG. 4 further shows the exposure lockout output 216. Before proceeding it is noted that the exposure timer circuit 204 of FIG. 4 is merely one example circuit. The exposure timer circuit 204 can be implemented in many equivalent ways, and thus the example circuit 204 should not be considered as a limitation of the invention. The example exposure timer circuit 204 comprises an operational amplifier 400 that defines a first input 402 coupled to a reference voltage, in the example circuit a reference voltage of one volt. The operational amplifier further defines a second input 404 coupled to the exposure time terminal 130. The output 406 couples to the control input of a transistor, which in the example is shown as a FET 408 having its source coupled to ground. The example circuit has a series of P-channel FETs 410, 412, and 414 having their gates coupled together, and each having its source coupled to a supply voltage, illustrative shown as a 3.3 volt supply. The drain of FET 412 is coupled to its base and also the drain of FET 408. FET 410 is coupled between the example 3.3 volts source and the second input 404 of the operational amplifier 400. The combination of operational amplifier 400, FET 408, and FETS 410 and 412 work to equalize the voltage as between the first input 402 and second input 404 of the operational amplifier 400, and thus in the example system FET 410 is biased to provide about 1 volt on the exposure time terminal 130. Because the bases of the FETS 410, 412, and 414 are coupled together, FET 414 is thus biased into its active region and produces a voltage and current at its drain proportional to the resistor 134.

During periods of time when the gate terminal 126 is asserted, the electrically controlled switch 416 (hereafter just switch 416) is conductive and the electrically controlled switch 418 (hereafter just switch 418) is non-conductive. Thus, the FET 414 charges capacitor 420 coupled to a second input 422 of comparator 424. When the voltage on capacitor 420 exceeds the reference voltage on the first input 426, the exposure lockout signal on the exposure lockout output 216 is asserted.

Referring simultaneously to FIGS. 3 and 4, the timing diagram of FIG. 3 shows voltage on capacitor 420 in the various situations of FIG. 3, the voltage as a function of time referred to as the capacitor signal 428. When the normal pulse 302 arrives, switch 416 becomes conductive and capacitor 420 begins charging at a rate derived from or controlled by the resistor 134. If the flash signal is de-asserted prior to the exposure time threshold, switch 416 become non-conductive and switch 418 becomes conductive to discharge capacitor 420 as shown. The process begins anew on the next pulse. However, now considering the long pulse 308, when the long pulse 308 arrives, switch 416 becomes conductive and capacitor 420 begins charging at a rate derived from or controlled by the resistor 134. In the example situation of the long pulse, however, when the capacitor 420 voltage exceeds the reference voltage, the exposure lockout signal is asserted. As previous discussed, assertion of the exposure lockout signal de-asserts the gate terminal 126 (FIG. 1) even though the long pulse 308 is still asserted. In the example circuit, the exposure lockout signal remains asserted until the next rising edge of the flash signal at time t7, but other reset signals are possible (e.g., reset based on de-assertion of the frame lockout signal). Regardless of the reset signal used, once reset the switch 416 becomes non-conductive and switch 418 momentarily becomes conductive (discharging capacitor 420), and the process begins anew.

Referring again just to FIG. 4. The example exposure timer circuit 204 implements a switch logic 430 that takes input from the exposure lockout output 216, the flash signal on the flash terminal 122 (FIG. 1), and possibly the gate signal on the gate terminal 126 (FIG. 1). The switch logic 430 controls the state of switches 416 and 418. In other words, the switch logic 430 makes switch 416 conductive when the flash signal on the flash terminal 122 is asserted (or, equivalently when the gate terminal 126 (FIG. 1) is asserted). The example switch logic 430 makes switch 416 non-conductive and switch 418 conductive either: when the flash signal on the flash terminal 122 is de-asserted if de-asserted before expiration of the exposure time threshold; or just prior to, or contemporaneous with, the next assertion of the flash signal.

Figure 5:
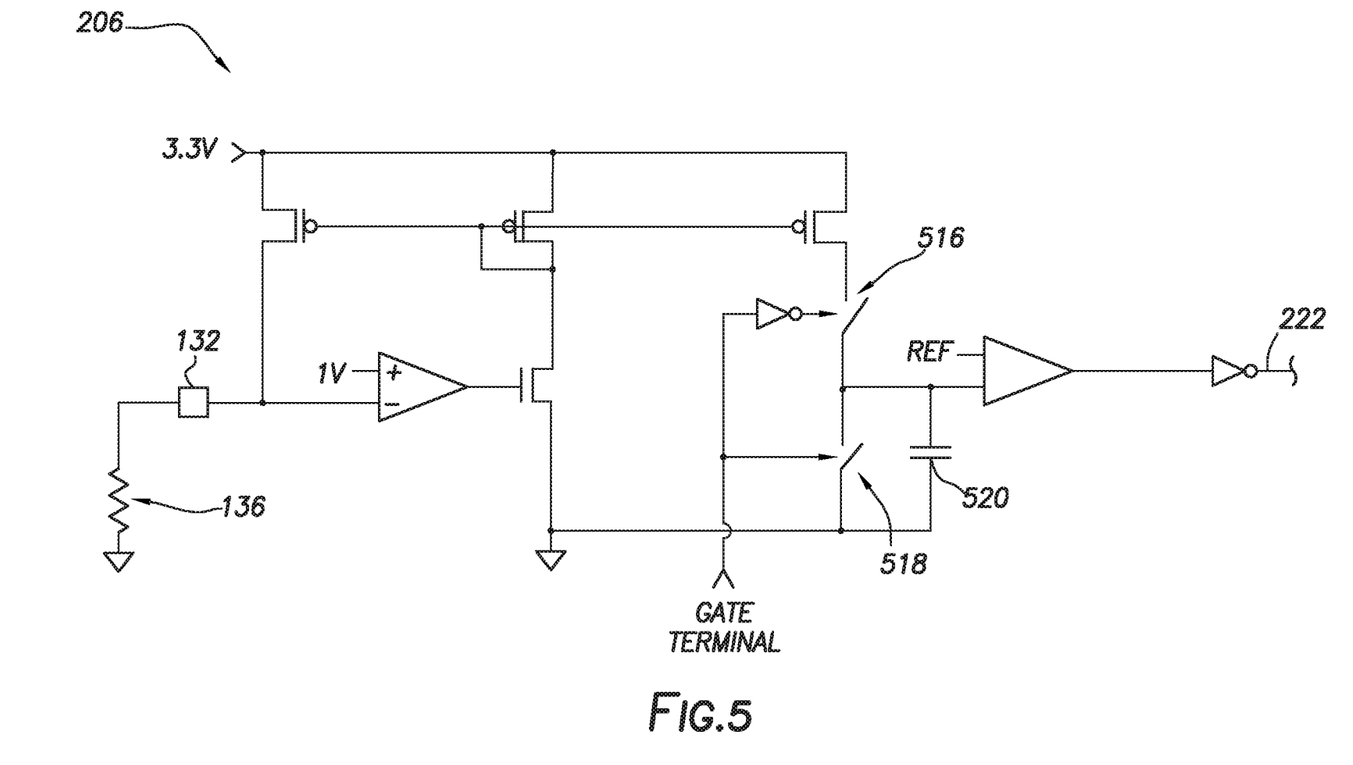
FIG. 5 shows an example frame timer circuit in accordance with at least some embodiments.

FIG. 5 shows an example frame timer circuit 206 in accordance with at least some embodiments. In particular, FIG. 5 shows the frame period terminal 132 coupled to external resistor 136. FIG. 5 further shows the frame lockout output 222. The example frame timer circuit 206 is similar to and operates in a similar fashion to the exposure timer circuit 204 of FIG. 4, and so as not to unduly complicate the discussion the internal connections and much of the internal operation of the operational amplifier, FETS, and comparator will not duplicated. When the gate terminal 126 is de-asserted (i.e., the falling edge of the gate signal), the frame lockout signal on the frame lockout output 222 is asserted and the switches 516 and 518 enable the capacitor 520 to charge at a rate derived from or controlled by resistor 136. When the voltage on capacitor 520 exceeds the reference voltage, the frame lockout signal on the frame lockout signal on the frame lockout output 222 is de-asserted.

Referring simultaneously to FIGS. 3 and 5, the timing diagram of FIG. 3 shows voltage on capacitor 520 in the various situations of FIG. 3, the voltage as a function of time referred to as the capacitor signal 528. When the normal pulse 302 ends, and more particularly when the gate terminal signal 312 is de-asserted at time t2: switch 516 becomes conductive; switch 518 becomes non-conductive; the frame lockout signal on the frame lockout output 222 is asserted; and capacitor 520 begins charging at a rate derived from or controlled by the resistor 136. When the voltage on capacitor 520 exceeds the reference voltage, the frame lockout signal on the frame lockout output 222 becomes de-asserted. The process begins anew on the falling edge of the gate terminal 126. However, now consider the double pulse 310. When the first pulse of the double pulse 310 ends, and more particularly when the gate terminal signal 312 is de-asserted at time t10: switch 516 becomes conductive; switch 518 becomes non-conductive; the frame lockout signal on the frame lockout output 222 is asserted; and capacitor 520 begins charging at a rate derived from or controlled by the resistor 136. During the period of time when the capacitor 520 is below the reference voltage the frame lockout signal is asserted. The second pulse of the double pulse 310 arrives at time t11; however, because the frame lockout signal is still asserted, the controller 202 (FIG. 2) refrains from asserting the gate terminal signal 312 as shown. When the voltage on capacitor 520 exceeds the reference voltage, the frame lockout signal on the frame lockout output 222 becomes de-asserted. And again the process begins anew on the falling edge of the gate terminal 126.

Referring again just to FIG. 5. The gate terminal signal on the gate terminal 126 (FIG. 1) in the example system controls the state of switches 516 and 518. In other words, when the gate terminal 126 is de-asserted, switch 516 is conductive and switch 518 is non-conductive. When the gate terminal signal on the gate terminal 126 is asserted, switch 516 is non-conductive and switch 518 is conductive.

Figure 6:
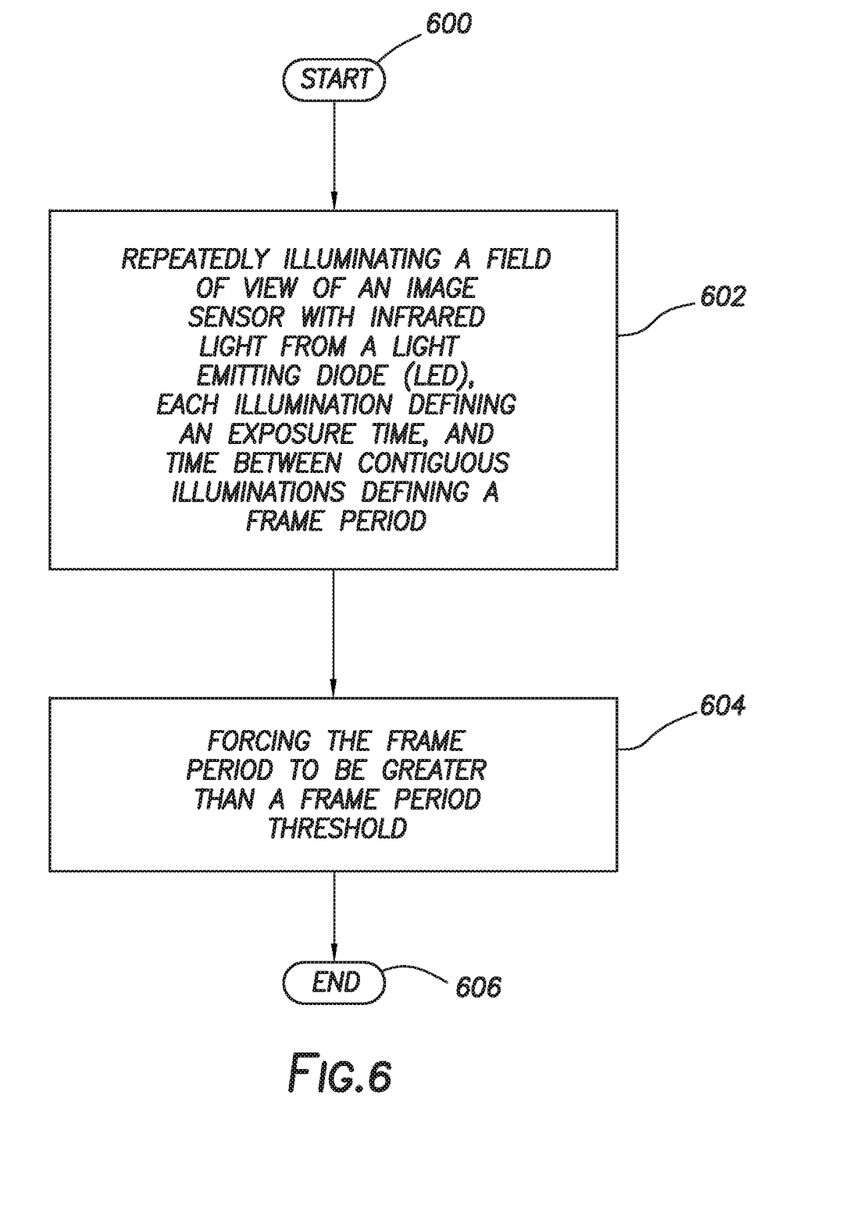
FIG. 6 shows a method in accordance with at least some embodiments.

FIG. 6 shows a flow diagram in accordance with at least some embodiments. In particular, the method starts (block 600) and comprises: repeatedly illuminating a field of view of an image sensor with infrared light from a light emitting diode (LED), each illumination defining an exposure time, and time between contiguous illuminations defining a frame period (block 602); and forcing the frame period to be greater than a frame period threshold (block 604). Thereafter the method ends (block 606).

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating an imaging system with an infrared illumination, comprising:
   repeatedly illuminating a field of view of an image sensor with infrared light from a light emitting diode (LED), each illumination defining an exposure time, and time between contiguous illuminations defining a frame period; and
   forcing the frame period to be greater than a frame period threshold by a first resistor coupled to a first terminal of a LED driver circuit.

2. The method of claim 1 wherein setting the frame period threshold further comprises setting the frame period threshold by the first resistor coupled between ground and the first terminal of the LED driver circuit.

3. The method of claim 1 further comprises limiting exposure time of each illumination to be less than an exposure time threshold.

4. The method of claim 3 wherein limiting the exposure time further comprises limiting the exposure time to be below the exposure time threshold set by a second resistor coupled to a second terminal of the LED driver circuit.

5. The method of claim 4 wherein limiting the exposure time further comprises limiting the exposure time to be below the exposure time threshold set by the second resistor coupled between ground and the second terminal of the LED driver circuit.

6. A method of operating an imaging system with an infrared illumination, comprising:
   repeatedly illuminating a field of view of an image sensor with infrared light from a light emitting diode (LED), each illumination defining an exposure time, and time between contiguous illuminations defining a frame period; and
   forcing the frame period to be greater than a frame period threshold;
   limiting exposure time of each illumination to be less than an exposure time threshold by setting the exposure time threshold by a resistor coupled to a terminal of a LED driver circuit.

7. The method of claim 6 wherein setting the exposure time threshold further comprises setting the exposure time threshold by the resistor coupled between ground and the terminal of the LED driver circuit.

8. A driver integrated circuit (IC) for driving infrared light emitting diodes, comprising:
   a flash terminal, a gate terminal, and a frame period terminal;
   a controller disposed within the driver IC, the controller coupled to the flash terminal, the gate terminal, and the frame period terminal; and
   the controller configured to:
      derive a frame period threshold based on a resistance coupled to the frame period terminal; and
      assert the gate terminal responsive to assertion of the flash terminal unless an immediately prior de-assertion of the gate terminal occurred within the frame period threshold.

9. A driver integrated circuit (IC) for driving infrared light emitting diodes, comprising:
   a flash terminal, a gate terminal, and a frame period terminal;
   a controller disposed within the driver IC, the controller coupled to the flash terminal, the gate terminal, and the frame period terminal, the controller comprising a frame timer circuit coupled to the frame period terminal, the frame timer circuit configured to assert a frame lockout signal upon de-assertion of the gate terminal, and the frame timer circuit configured to de-assert the frame lockout signal after expiration of a frame period threshold derived from a resistance coupled to the frame period terminal; and
   the controller is configured to hold the gate terminal de-asserted when the frame lockout signal is asserted.

10. A driver integrated circuit (IC) for driving infrared light emitting diodes, comprising:
    a flash terminal, a gate terminal, and an exposure time terminal;
    a controller disposed within the driver IC, the controller coupled to the flash terminal, the gate terminal, and the exposure time terminal; and
    the controller configured to:
       derive an exposure time threshold based on a resistance coupled to the exposure time terminal; and
       assert the gate terminal responsive to assertion of the flash terminal unless an immediately prior de-assertion of the gate terminal occurred within a frame period threshold, the assertion of the gate terminal until an exposure time exceeds the exposure time threshold.

11. A driver integrated circuit (IC) for driving infrared light emitting diodes, comprising:
    a flash terminal, a gate terminal, and an exposure time terminal;
    a controller disposed within the driver IC, the controller coupled to the flash terminal, the gate terminal, and the exposure time terminal, the controller comprising an exposure timer circuit coupled to the exposure time terminal, the exposure timer circuit configured to de-assert an exposure lockout signal upon assertion of the flash terminal, and the exposure timer circuit configured to assert the exposure lockout signal after expiration of exposure time threshold derived from a resistance coupled to the exposure time terminal; and the controller is configured to:
    assert the gate terminal responsive to assertion of the flash terminal unless an immediately prior de-assertion of the gate terminal occurred within a frame period threshold; and
    de-assert the gate terminal when the exposure lockout signal is asserted.

12. A system for imaging a field of view of an image sensor, comprising:
    an image sensor defining a flash output;
    a light emitting diode (LED) driver defining a flash input, a gate output, an exposure time input, and a frame period input, the flash input coupled to the flash output of the image sensor;
    a first resistor coupled to the exposure time input, resistance of the first resistor controls an exposure time threshold;
    a second resistor coupled to the frame period input, resistance of the second resistor controls a frame period threshold;
    an infrared LED system defining an anode connection and a cathode connection, the anode connection coupled to a source of power;
    an electrically controlled switch defining a control input, the electrically controlled switch coupled between the cathode connection and ground, and the control input coupled to the gate output of the LED driver;
    the LED driver configured to:
        assert the gate output responsive to assertion of the flash input unless an immediately prior de-assertion of the gate output occurred within the frame period threshold; and
        assert the gate output responsive to assertion of the flash input until an exposure time exceeds the exposure time threshold.

13. The system of claim 12 further comprising:
the first resistor coupled between the exposure time input and ground; and
the second resistor coupled between the frame period input and ground.

14. The system of claim 12 wherein the LED driver further comprises:
    a frame timer circuit coupled to the frame period input, the frame timer circuit configured to assert a frame lockout signal upon de-assertion of the gate output, and the frame timer circuit configured to de-assert the frame lockout signal after expiration of the frame period threshold; and
    the LED driver configured to hold the gate output de-asserted during periods of time when the frame lockout signal is asserted.

15. The system of claim 12 wherein the LED driver further comprises:
    an exposure timer circuit coupled to the exposure time input, the exposure timer circuit configured to de-assert an exposure lockout signal upon assertion of the flash input, and the exposure timer circuit configured to assert the exposure lockout signal after expiration of the exposure time threshold; and
    the LED driver is configured to de-assert the gate output when the exposure lockout signal is asserted.

16. The system of claim 12 further comprising:
    a frame timer circuit coupled to the frame period input, the frame timer circuit configured to assert a frame lockout signal upon de-assertion of the flash input, and the frame timer circuit configured to de-assert the frame lockout signal after expiration of the frame period threshold; and
    an exposure timer circuit coupled to the exposure time input, the exposure timer circuit configured to de-assert an exposure lockout signal upon assertion of the flash input, and the exposure timer circuit configured to assert the exposure lockout signal after expiration of the exposure time threshold; and
    the LED driver is configured to de-assert the gate output when the exposure lockout signal is asserted, and configured to hold the gate output de-asserted during periods of time when the exposure lockout signal is asserted.

17. The system of claim 12 wherein the infrared LED system comprise a plurality of LEDs coupled in series.

* * * * *